Nov. 19, 1929.  J. POISSANT DE CLOUD  1,736,130
VEHICLE WHEEL
Filed Dec. 29, 1926   2 Sheets-Sheet 1
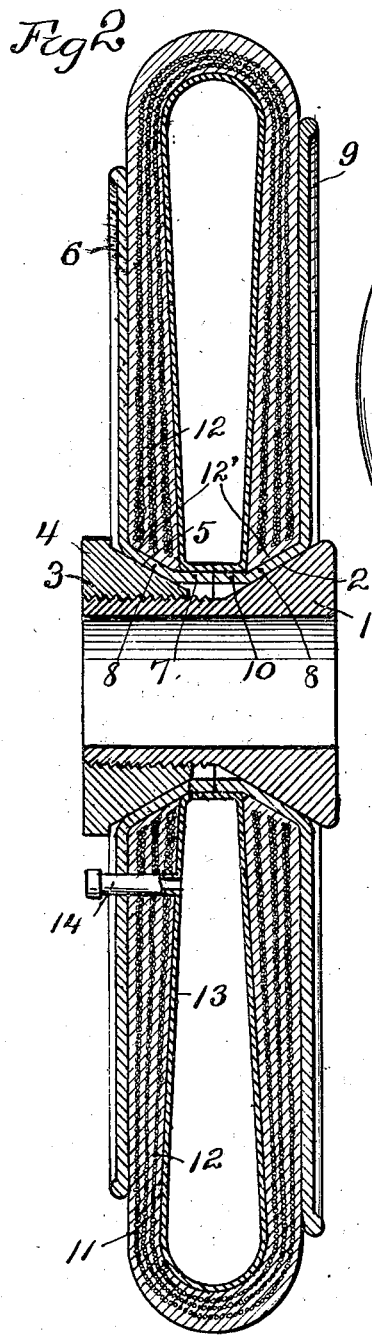
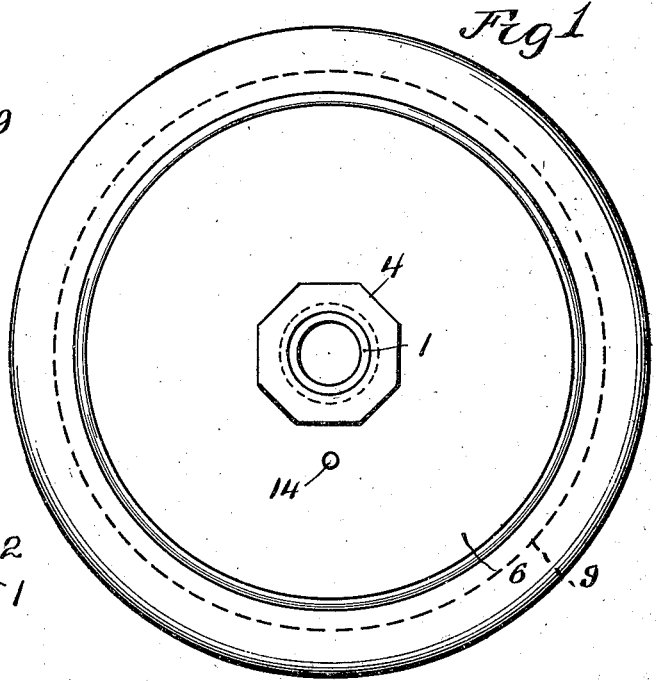
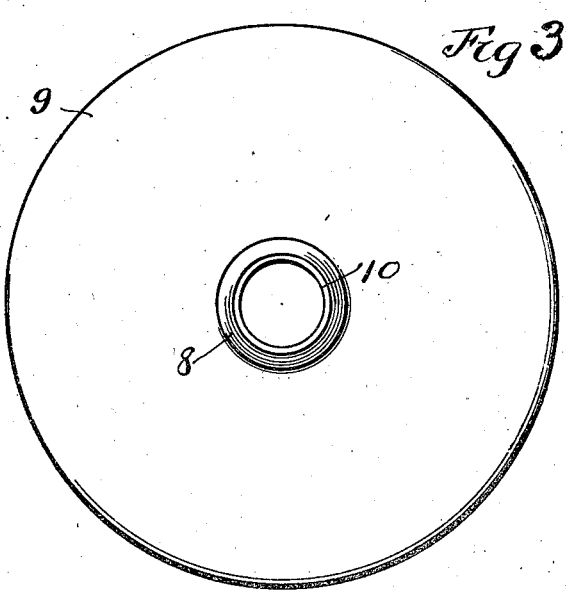
Witness:
R. E. Hamilton
INVENTOR.
Joseph Poissant De Cloud
BY Warren D. House
His ATTORNEY Nov. 19, 1929.   J. POISSANT DE CLOUD   1,736,130
VEHICLE WHEEL
Filed Dec. 29, 1926   2 Sheets-Sheet 2
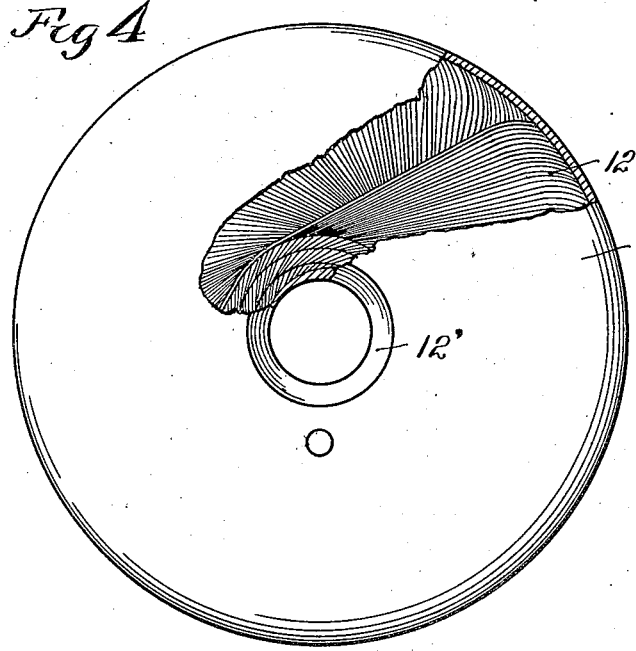
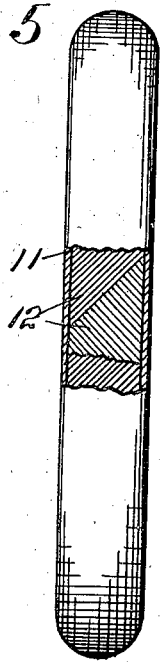
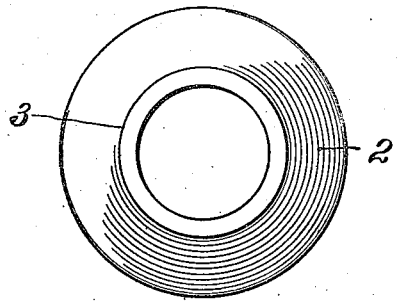
INVENTOR.
Joseph Poissant De Cloud
BY Warren D. House
His ATTORNEY.

Patented Nov. 19, 1929

1,736,130

UNITED STATES PATENT OFFICE

JOSEPH POISSANT DE CLOUD, OF KANSAS CITY, MISSOURI

VEHICLE WHEEL

Application filed December 29, 1926. Serial No. 157,685.

My invention relates to improvements in vehicle wheels particularly adapted for automobile use.

One of the objects of my invention is to provide a novel vehicle wheel which has great resiliency, and a large capacity for air for inflation purposes, which has great durability and strength, which eliminates the usual rim, and spokes or supporting disks, which is simple, relatively cheap to make, and which can be assembled or disassembled quickly and with ease.

The novel features of my invention are hereinafter fully described and claimed.

In the accompanying drawings, which illustrate the preferred embodiment of my invention, Fig. 1 is an outside elevation of my improved vehicle wheel.

Fig. 2 is an enlarged vertical central sectional view of the same.

Fig. 3 is an inside elevation of the inner clamping plate.

Fig. 4 is an outside elevation, partly broken away, of the resilient casing.

Fig. 5 is an edge view, partly broken away, of the casing.

Fig. 6 is an outside end elevation of the hub sleeve.

Similar reference characters designate similar parts in the different views.

The hub of my improved vehicle wheel comprises a sleeve 1 adapted to be mounted on an axle or to be fitted on the auxiliary hub with which some wheels are provided.

The sleeve 1 has adjacent to one end an inwardly converging, preferably conical, peripheral portion 2, Fig. 2, and an externally threaded end portion 3 upon which is adapted to be fitted a nut 4 having an inwardly converging, preferably conical, peripheral portion 5.

The bore of the nut is, preferably, of greater diameter throughout than the bore of the sleeve, so as not to contact with the axle, with consequent disadjustment on the sleeve.

6 designates a circular outer clamping plate having a central inwardly extending tubular portion 7, the outer portion 8 of which is, preferably, outwardly flaring and adapted to be fitted on the converging peripheral surface 5 of the nut 4.

9 designates an inner circular clamping plate having a central inwardly extending tubular portion 10, the inner end of which is the same diameter as the inner end of the tubular portion 7 of the outer clamping plate 6.

The nut 4 is adapted to be adjusted on the sleeve 1 to a position in which it will force the clamping plate inwardly to a position in which the inner end of the tubular portion 7 will bear against the inner end of the tubular portion 10. The latter also has a flaring portion 8.

Located between and adapted to have its outer sides engaging and compressed respectively by the clamping plates 6 and 9 is a circular resilient, and preferably hollow, and inflatable, casing 11, as shown in Fig. 2. The casing 11 is preferably of the usual soft rubber used in tire construction, and it is preferably provided with re-enforcing, which may be of any suitable material, such as cord material 12 embedded in the rubber.

The casing 11 extends radially beyond the peripheries of the plates 6 and 9, and the peripheral portion of the casing is adapted to effect the function of a tire tread.

The inner peripheral portions of the casing 11 adjacent to the axial center thereof may be outwardly flaring at 12', and adapted to respectively bear on the outer peripheries of the flaring portions of the tubular portions 7 and 10.

The side portions of the casing 11 preferably increase in thickness toward the central portion of the casing, as shown in Fig. 2.

The casing 11 may be inflated by means of an annular inner inflatable tube 13, of soft rubber, which is mounted in the casing 11 and encircles and is adapted to have a bearing on the peripheries of the tubular portions 7 and 10 of the clamping plates 6 and 9. The inner tube 13 is provided with the usual air filling tube 14, which is adapted to extend through registering holes provided therefor in the casing 11 and outer clamping plate 6.

The inner clamping plate 9 is preferably of larger diameter than the clamping plate 6, so that in the event of deflation of the casing 11 accidentally, the inner plate 9 may carry the load.

If both clamping plates were the same in diameter and deflation occurs, and the wheel is run on the edges of both clamping plates, there is liability of damage thereto by reason of a rock or a railroad rail becoming wedged therebetween. This is not liable to occur when the plates are different in diameter.

In assembling the parts, the inner clamping plate 9 is slipped onto the converging portion 2 of the sleeve 1. The casing 11 with the inner tube 13 in it is then slipped onto the tubular portion 10 of the plate 9, after which the outer clamping plate 6 is mounted against the outer side of the casing 11 with its tubular portion 7 extending into the central hole in the casing 11. The nut 4 is then fitted on the sleeve 1 and tightened thereon until the tubular portions 7 and 10 abut against each other.

The inner tube 13 is then inflated in the usual manner, thereby causing the casing 11 to be inflated and to bear tightly against the clamping plates 6 and 9.

The casing 11 in its use effects the function of the usual rim and spokes or disk of the ordinary wheel, and owing to its great air capacity, and of its extension to closely adjacent to the hub, it has a maximum of resiliency, and affords easy riding with a minimum of jar or vibration.

What I claim is:—

1. In a vehicle wheel, a hub comprising two tubular members having threaded engagement with each other, two clamping plates of different diameters respectively engaging and adapted to be forced toward each other by said members, and adapted to clamp between them an annular resilient tire.

2. In a vehicle wheel, a hub comprising two tubular members having threaded engagement with each other and having each an inwardly converging peripheral surface, and two clamping plates respectively fitted on said converging surfaces and adapted to be forced toward each other by said members, and adapted to clamp between them an annular resilient tire.

3. In a vehicle wheel, a hub comprising a sleeve having an inwardly converging peripheral portion and an externally threaded portion and a nut mounted on said threaded portion and having an inwardly converging peripheral portion, and two clamping plates each having an inwardly extending tubular portion, said tubular portions being respectively mounted on said converging portions and being adapted to have their inner ends abut against each other, said plates being adapted to clamp between them an annular resilient tire.

4. In a vehicle wheel, a hub comprising a sleeve having an inwardly converging peripheral portion and an externally threaded portion and a nut mounted on said threaded portion and having an inwardly converging peripheral portion, and two clamping plates having respectively two inwardly extending tubular portions which abut against each other and having respectively flaring portions respectively bearing on said converging portions, and said plates being adapted to clamp between them an annular resilient tire.

In testimony whereof I have signed my name to this specification.

JOSEPH POISSANT DE CLOUD.